UNITED STATES PATENT OFFICE.

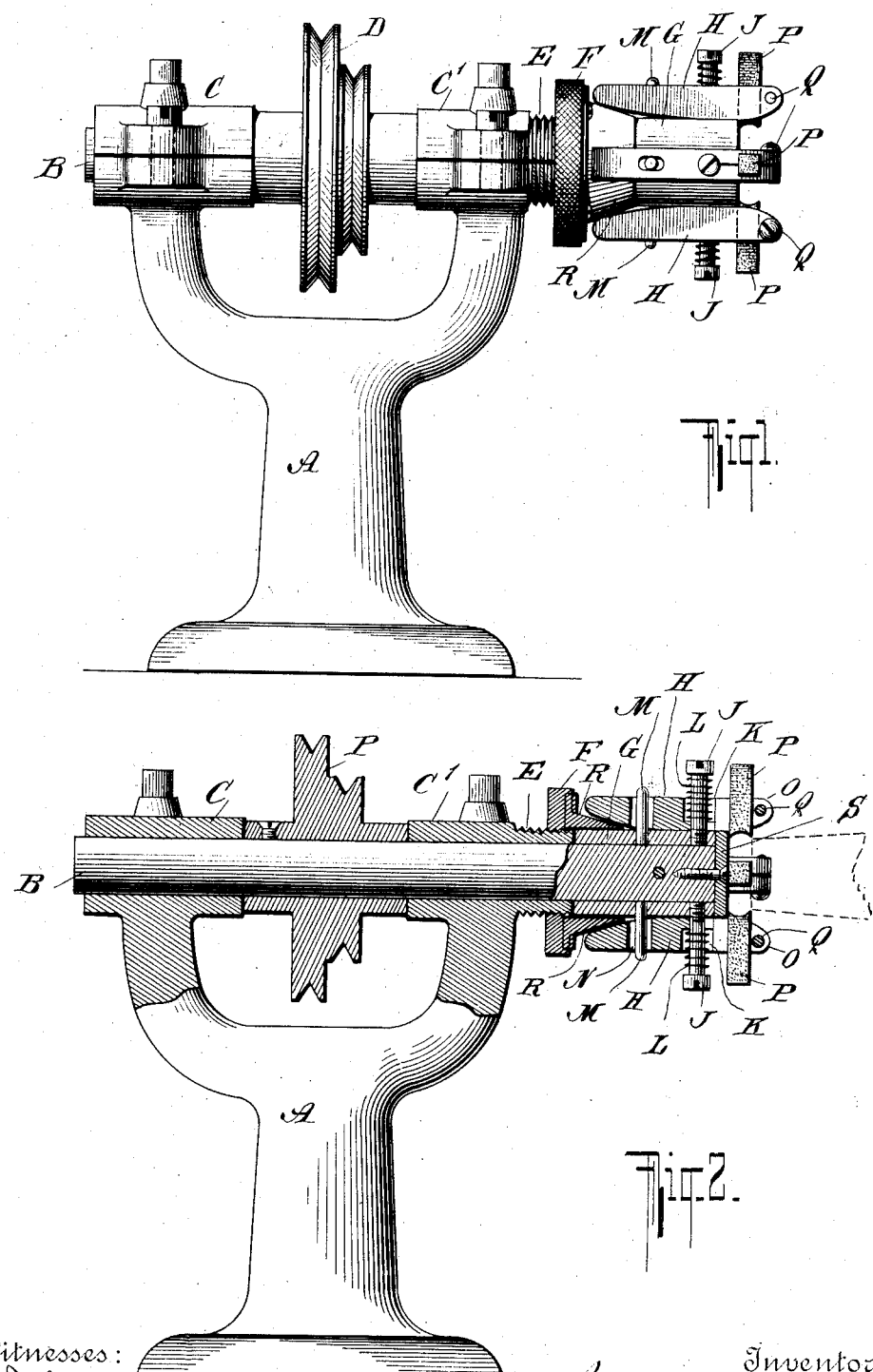

JOHN AUGUSTUS HICKS, OF SUMMIT, NEW JERSEY, ASSIGNOR TO AUTO STOPPER COMPANY OF NEW YORK, N. Y.

APPARATUS FOR REMOVING GLAZE FROM GLASS VESSELS.

No. 879,167.      Specification of Letters Patent.      Patented Feb. 18, 1908.

Application filed May 22, 1907. Serial No. 375,168.

*To all whom it may concern:*

Be it known that I, JOHN AUGUSTUS HICKS, a citizen of the United States, residing at Summit, Union county, New Jersey, have invented certain new and useful Improvements in Apparatus for Removing Glaze From Glass Vessels, of which the following is a specification.

My invention relates primarily to apparatus for removing the glaze on exterior surfaces of glass beads upon the necks of vessels and secondarily to sizing them and it consists in certain elements and combination of elements fully set out in and claimed in the following specification.

In order that those skilled in the art to which my invention appertains, may understand, construct, and use my invention I will proceed to describe it referring to the accompanying drawings forming part of this specification in which Figure 1 is a side elevation and Fig. 2 is an elevation and part section.

A is the standard which carries the operating parts of the apparatus.

B is a spindle supported in bearings C, $C^1$.

D is a pulley secured to spindle B midway between bearings C, $C^1$.

E is a hub on bearing $C^1$ threaded exteriorly to receive a threaded nut F.

G is a sleeve secured on the outer end of spindle B.

H are jaws secured on the exterior of sleeve G by screws J, having broad heads.

K are recesses in jaws H, and springs L bear against the bottoms of recesses K and under the heads of screws J, to hold the jaws in tension toward sleeve G.

M are pins secured in sleeve G to guide the movement of jaws H, passing through holes N in jaws H.

The front ends of jaws H are split longitudinally at O for a short distance and shaped between the two parts of the divisions of the splits to hold abrading pieces P. These pieces P are clamped in said divisions by screws Q. The rear ends of jaws H are shaped on their under sides tapering from inside to outside for a short distance longitudinally.

R is a sleeve attached to nut F on its front side and tapering exteriorly inwardly and centrally and slides under the tapering ends of jaws H.

S is a piece secured on the outer end of spindle B beneath the jaws H and is intended to be movable, and turn independently of the spindle B.

T in dotted lines Fig. 2 represents a vessel with its bead in the jaws H in the act of being treated to remove the glaze.

The operation of my invention is as follows: The jaws H being adjusted the desired distance apart as to their front ends which carry the abrading pieces P, which is done by first setting the pieces P to some predetermined size of vessel bead, and screwing the nut F with the attached tapering sleeve R under the inclined inner or rear ends of the jaws H until the abrading pieces P are set to the exact size required, the spindle B is set in rotary motion by the pulley D from some source of power which revolves the jaws H and abrading pieces P, a vessel with its bead is then entered between the pieces P as shown at Fig. 2 and the springs K brought into operation to press the pieces P gently on the bead until the glaze on the bead is removed. If it is desired to size the bead in addition to removing the glaze, the bottle is kept in the jaws until the proper size is attained.

Having now fully described my invention and the manner in which I have embodied it what I claim as new and as my invention and desire to secure by Letters Patent is

An apparatus for abrading the natural glaze on the outer surfaces of vessel necks, consisting of a supporting frame; a spindle in said frame revolved by power; jaws elastically and adjustably held upon the end of the said spindle; abrading pieces adjustably held in said jaws, all arranged to operate to press upon and abrade the glaze upon the outer surface of vessel necks substantially as specified.

In testimony whereof, I have signed my name to this specification in the presence of two subscribing witnesses, this eleventh day of May, 1907.

JOHN AUGUSTUS HICKS.

Witnesses:
ALBERT D. CROSS,
JAMES M. HICKS.